(12) United States Patent
Chang et al.

(10) Patent No.: US 12,250,648 B2
(45) Date of Patent: Mar. 11, 2025

(54) MOBILE DEVICE AND CONTROL METHOD INTERACTING WITH CONDUCTIVE ELEMENT USING PROXIMITY SENSOR

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 365 days.

(21) Appl. No.: 17/819,978

(22) Filed: Aug. 16, 2022

(65) Prior Publication Data
US 2024/0007975 A1    Jan. 4, 2024

(30) Foreign Application Priority Data
May 26, 2022   (TW) .................................. 111119607

(51) Int. Cl.
  *H04W 52/38*   (2009.01)
  *H01Q 5/335*   (2015.01)
  *H01Q 9/42*    (2006.01)
(52) U.S. Cl.
  CPC ............ *H04W 52/38* (2013.01); *H01Q 5/335* (2015.01); *H01Q 9/42* (2013.01)
(58) Field of Classification Search
  CPC ........ H01Q 1/243; H01Q 9/42; H01Q 9/0442; H01Q 21/28; H01Q 5/328; H01Q 5/371; H01Q 1/48; H01Q 1/50; H01Q 1/38; H01Q 5/335; H01Q 5/378; H01Q 13/10; H01Q 5/40; H04B 1/18; H04B 1/0458; H04B 1/401; H04B 1/0053; H04B 1/38;
(Continued)

(56) References Cited

U.S. PATENT DOCUMENTS 8,947,305 B2   2/2015  Amm et al.
9,723,434 B1*  8/2017  Chang ................... H04W 8/005
(Continued)

FOREIGN PATENT DOCUMENTS

TW   201541706 A   11/2015
TW   201818612 A   5/2018

OTHER PUBLICATIONS

Chinese language office action dated Jun. 26, 2023, issued in application No. TW 111119607.

*Primary Examiner* — Golam Sorowar
(74) *Attorney, Agent, or Firm* — McClure, Qualey & Rodack, LLP

(57) ABSTRACT

A mobile device includes a hybrid antenna, a tunable circuit element, an RF (Radio Frequency) module, and a proximity sensor. The tunable circuit element provides an impedance value. The RF module generates RF power. The hybrid antenna is coupled through the tunable circuit element to the RF module. The proximity sensor is respectively coupled to the hybrid antenna, the tunable circuit element, and the RF module, and is configured to detect a specific distance between the hybrid antenna and a conductive element. The tunable circuit element and the RF module are operated according to relative information of the specific distance. If the specific distance is shorter than or equal to a first threshold distance, the RF module will reduce the RF power. If the specific distance is shorter than or equal to a second threshold distance, the tunable circuit element will change the impedance value.

14 Claims, 4 Drawing Sheets

(58) Field of Classification Search
CPC .... H04B 7/024; H04B 7/0404; H04B 7/0413; H04B 7/0417; H04B 7/0608; H04B 7/0628; H04B 7/0632; H04B 7/0691
See application file for complete search history.

(56) References Cited

U.S. PATENT DOCUMENTS

| | | | |
|---|---|---|---|
| 9,865,927 | B2 | 1/2018 | Tsai |
| 12,111,393 | B2* | 10/2024 | Behnamfar ......... G01S 5/02521 |
| 2013/0017860 | A1* | 1/2013 | Chen ..................... H01Q 1/241 |
| | | | 455/556.1 |
| 2014/0315592 | A1* | 10/2014 | Schlub ............... H04W 52/367 |
| | | | 455/522 |
| 2015/0303568 | A1* | 10/2015 | Yarga .................... H01Q 5/321 |
| | | | 343/722 |
| 2020/0203810 | A1 | 6/2020 | Tsai |
| 2022/0381895 | A1* | 12/2022 | Hur ......................... H01Q 3/34 |
| 2023/0132977 | A1* | 5/2023 | Sambhwani .......... H04W 52/38 |
| | | | 455/522 |
| 2023/0244294 | A1* | 8/2023 | Chang .................. G06F 1/1618 |
| | | | 455/127.1 |

* cited by examiner

MOBILE DEVICE AND CONTROL METHOD INTERACTING WITH CONDUCTIVE ELEMENT USING PROXIMITY SENSOR

CROSS REFERENCE TO RELATED APPLICATIONS

This application claims priority of Taiwan Patent Application No. 111119607 filed on May 26, 2022, the entirety of which is incorporated by reference herein.

BACKGROUND OF THE INVENTION

Field of the Invention

The disclosure generally relates to a mobile device, and more particularly, it relates to a mobile device and a control method thereof.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna is an indispensable component in a mobile device that supports wireless communication. However, the antenna is easily affected by adjacent metal components, which often interfere with the antenna and degrade the overall communication quality. Alternatively, the SAR (Specific Absorption Rate) may be too high to comply with regulations and laws. Accordingly, there is a need to propose a novel solution for solving the problems of the prior art.

BRIEF SUMMARY OF THE INVENTION

In an exemplary embodiment, the disclosure is directed to a mobile device interacting with a conductive element. The mobile device includes a hybrid antenna, a tunable circuit element, an RF (Radio Frequency) module, and a proximity sensor. The hybrid antenna has dual functions of a radiator and a sensing pad. The tunable circuit element provides an impedance value. The RF module generates RF power. The hybrid antenna is coupled through the tunable circuit element to the RF module. The proximity sensor is respectively coupled to the hybrid antenna, the tunable circuit element, and the RF module, and is configured to detect a specific distance between the hybrid antenna and the conductive element. The tunable circuit element and the RF module are operated according to the relative information of the specific distance. If the specific distance is shorter than or equal to a first threshold distance, the RF module will reduce the RF power. If the specific distance is shorter than or equal to a second threshold distance, the tunable circuit element will change the impedance value.

In some embodiments, the first threshold distance is substantially equal to 10 mm, and the second threshold distance is substantially equal to 5 mm.

In some embodiments, the hybrid antenna includes a ground element, a first radiation element, a second radiation element, a third radiation element, a fourth radiation element, and a dielectric substrate. The first radiation element is coupled through the tunable circuit element to the ground element. The first radiation element is further coupled to the proximity sensor. The second radiation element is coupled to a feeding point. The third radiation element is coupled to the feeding point. The fourth radiation element is coupled to the ground element. The first radiation element, the second radiation element, the third radiation element, and the fourth radiation element are all disposed on the dielectric substrate.

In some embodiments, the first radiation element substantially has an L-shape including a wide portion and a narrow portion, and the narrow portion is coupled through the wide portion to the tunable circuit element.

In some embodiments, the second radiation element substantially has a J-shape which is adjacent to the first radiation element.

In some embodiments, the third radiation element substantially has a W-shape which is adjacent to the first radiation element and the fourth radiation element. The fourth radiation element substantially has a straight-line shape.

In some embodiments, the tunable circuit element includes a first capacitor, a second capacitor, and a switch element. The first capacitor is coupled to the ground element. The second capacitor is coupled to the ground element. The switch element is coupled to the first radiation element. The switch element is switchable between the first capacitor and the second capacitor.

In some embodiments, the hybrid antenna covers a first frequency band, a second frequency band, a third frequency band, and a fourth frequency band. The first frequency band is from 600 MHz to 960 MHz. The second frequency band is from 1710 MHz to 2170 MHz. The third frequency band is from 2300 MHz to 2700 MHz. The fourth frequency band is from 3300 MHz to 3800 MHz.

In some embodiments, the length of the first radiation element is substantially equal to 0.25 wavelength of the lowest frequency of the first frequency band. The length of the second radiation element is substantially equal to 0.25 wavelength of the highest frequency of the first frequency band. The length of the third radiation element is substantially equal to 0.25 wavelength of the second frequency band. The length of the fourth radiation element is substantially equal to 0.25 wavelength of the fourth frequency band.

In another exemplary embodiment, the disclosure is directed to a control method that includes the steps of: providing a hybrid antenna, a tunable circuit element, an RF module, and a proximity sensor, wherein the hybrid antenna is coupled through the tunable circuit element to the RF module, and the proximity sensor is respectively coupled to the hybrid antenna, the tunable circuit element, and the RF module; detecting a specific distance between the hybrid antenna and a conductive element via the proximity sensor; comparing the specific distance with a first threshold distance; if the specific distance is shorter than or equal to the first threshold distance, reducing RF power of the RF module; comparing the specific distance with a second threshold distance; and if the specific distance is shorter than or equal to the second threshold distance, changing an impedance value of the tunable circuit element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
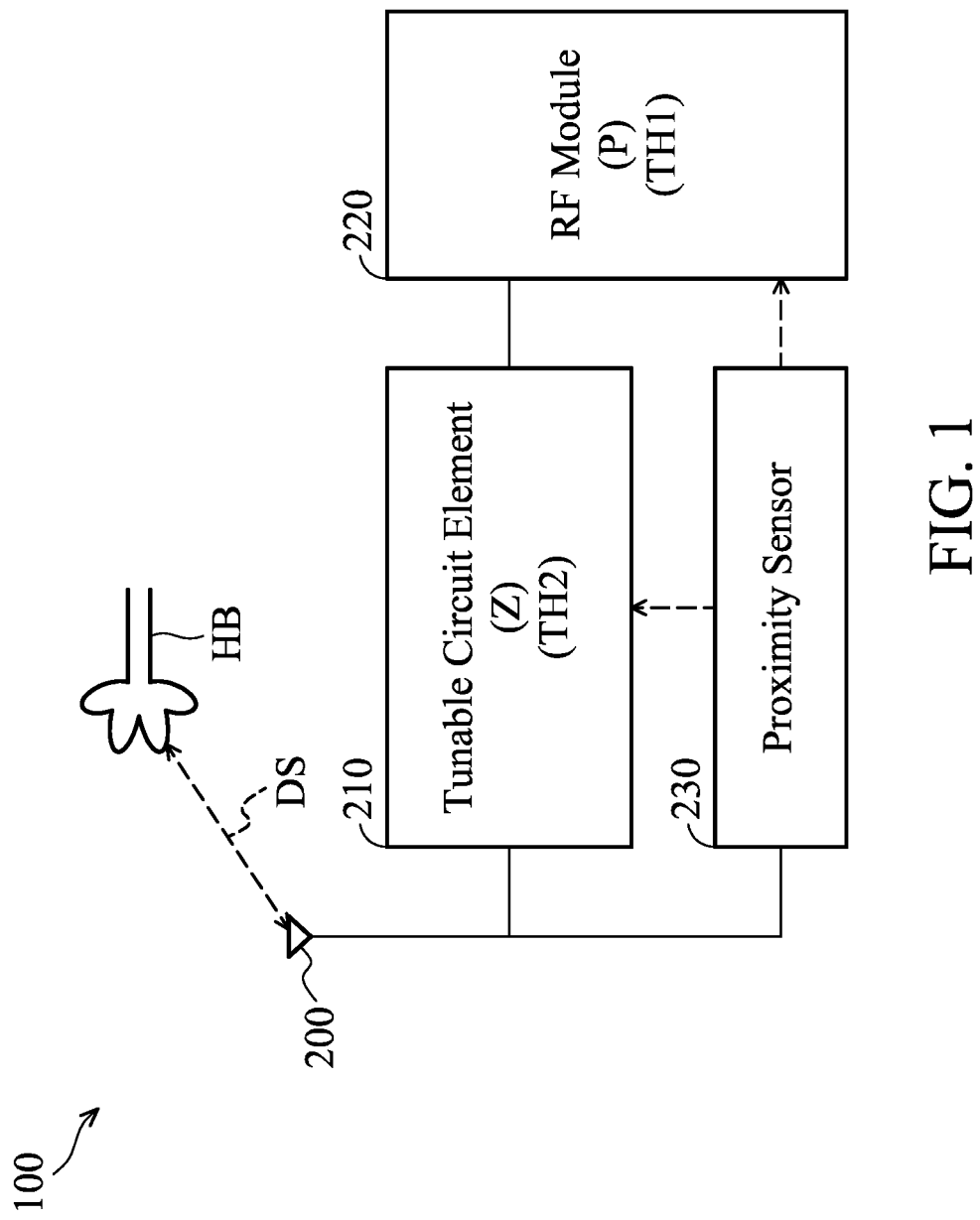
FIG. 1 is a diagram of a mobile device according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a mobile device 100 according to an embodiment of the invention. For example, the mobile device 100 may be a tablet computer or a notebook computer. In the embodiment of FIG. 1, the mobile device 100 at least includes a hybrid antenna 200, a tunable circuit element 210, an RF (Radio Frequency) module 220, and a proximity sensor 230. The mobile device 100 may interact with a conductive element HB. For example, the conductive element HB may be an adjacent metal element or a human body part, but it is not any portion of the mobile device 100. It should be understood that the mobile device 100 may further include other components, such as a processor, a touch control panel, a speaker, a battery module, and a housing, although they are not displayed in FIG. 1.

The hybrid antenna 200 has the dual function of serving as both radiator and sensing pad. That is, the hybrid antenna 200 not only receives an RF signal relative to the RF module 220 but also serves as the sensing pad of the proximity sensor 230. The tunable circuit element 210 provides an impedance value Z. The RF module 220 generates RF power P. The hybrid antenna 200 is coupled through the tunable circuit element 210 to the RF module 220. The proximity sensor 230 is respectively coupled to the hybrid antenna 200, the tunable circuit element 210, and the RF module 220. The proximity sensor 230 is configured to detect a specific distance DS between the hybrid antenna 200 and the conductive element HB. Next, the proximity sensor 230 transmits the relative information of the specific distance DS to the tunable circuit element 210 and the RF module 220. Thus, the tunable circuit element 210 and the RF module 220 are operated according to the relative information of the specific distance DS. For example, the RF module 220 can compare the specific distance DS with a first threshold distance TH1. If the specific distance DS is longer than the first threshold distance TH1, the RF module 220 will maintain the RF power P at a predetermined level. Conversely, if the specific distance DS is shorter than or equal to the first threshold distance TH1, the RF module 220 will reduce the RF power P to a relatively low level. For example, the tunable circuit element 210 can compare the specific distance DS with a second threshold distance TH2. The second threshold distance TH2 may be shorter than the first threshold distance TH1. If the specific distance DS is longer than the second threshold distance TH2, the tunable circuit element 210 will maintain the impedance value Z at a predetermined value. Conversely, if the specific distance DS is shorter than or equal to the second threshold distance TH2, the tunable circuit element 210 will change the impedance value Z to a modified value. With such a design, even if the conductive element HB is very close to the mobile device 100, the proposed mobile device 100 can fine-tune and optimize its relative SAR (Specific Absorption Rate) and impedance matching, thereby significantly improving its whole communication quality.

In some embodiments, the operations of the tunable circuit element 210 and the RF module 220 according to the specific distance DS will be described as the following Table I:

TABLE I

Relationship between Specific Distance
DS and RF Power P/Impedance Value Z

|  | DS < TH2 | TH2 < DS < TH1 | DS > TH1 |
|---|---|---|---|
| RF Power P | Relatively Low Level | Relatively Low Level | Predetermined Level |
| Impedance Value Z | Modified Value | Predetermined Value | Predetermined Value |

The following embodiments will introduce different configurations and detail structural features of the mobile device 100. It should be understood that these figures and configurations are merely exemplary, rather than limitations of the invention.

Figure 2:
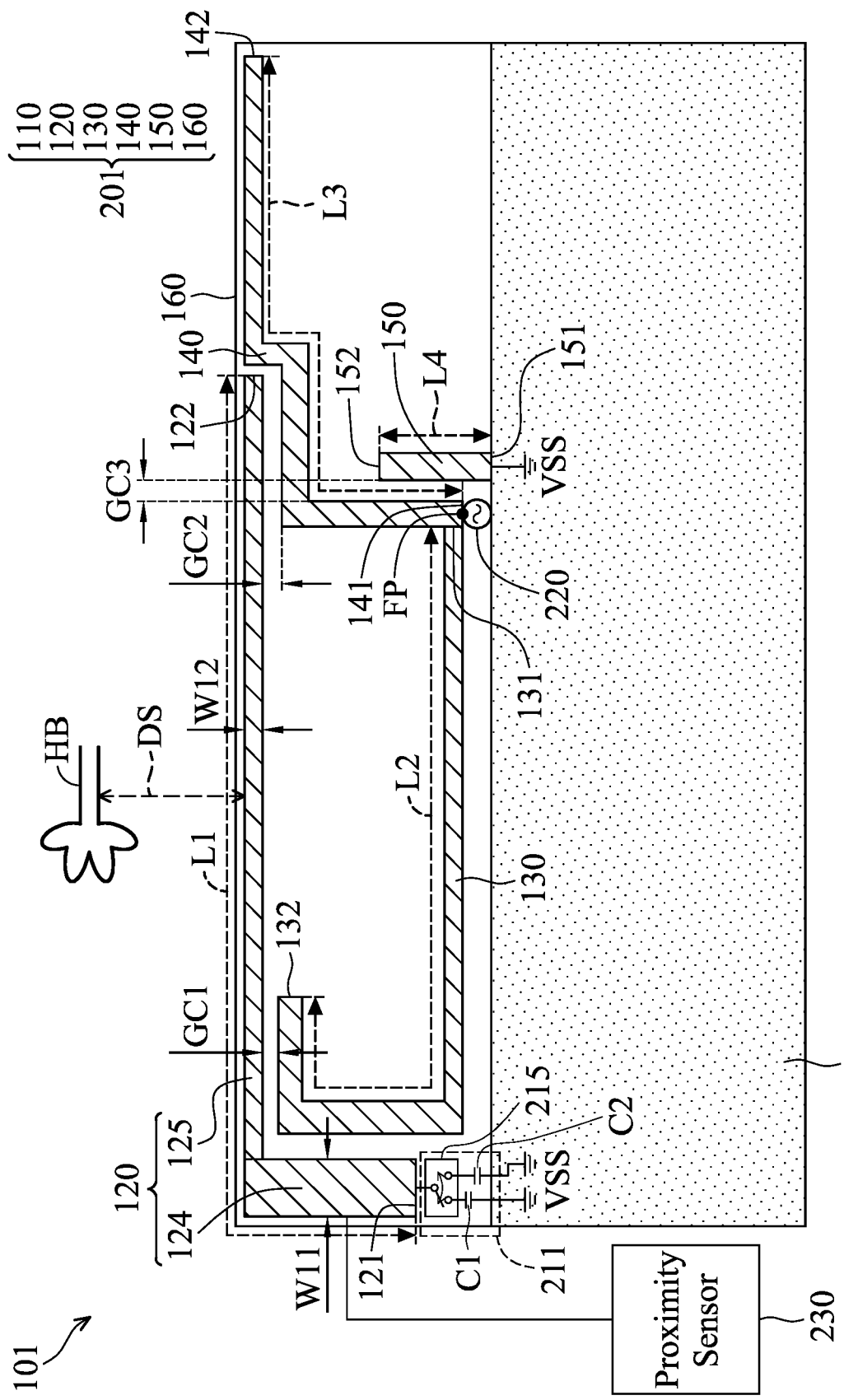
FIG. 2 is a top view of a mobile device according to an embodiment of the invention.

FIG. 2 is a top view of a mobile device 101 according to an embodiment of the invention. FIG. 2 is similar to FIG. 1. In the embodiment of FIG. 2, a hybrid antenna 201 of the mobile device 101 includes a ground element 110, a first radiation element 120, a second radiation element 130, a third radiation element 140, a fourth radiation element 150, and a dielectric substrate 160. The ground element 110, the first radiation element 120, the second radiation element 130, the third radiation element 140, and the fourth radiation element 150 may all be made of metal materials, such as copper, silver, aluminum, iron, or their alloys.

The ground element 110 may be implemented with a ground copper foil, which can provide a ground voltage VSS. For example, the ground element 110 may be coupled to a system ground plane (not shown) of the mobile device 101.

The first radiation element 120 may substantially have a variable-width L-shape. Specifically, the first radiation element 120 has a first end 121 and a second end 122. The first end 121 of the first radiation element 120 is coupled through a tunable circuit element 211 to the ground element 110. The second end 122 of the first radiation element 120 is an open end. In some embodiments, the first radiation element 120 includes a wide portion 124 adjacent to the first end 121 and a narrow portion 125 adjacent to the second end 122. The narrow portion 125 is coupled through the wide portion 124 to the tunable circuit element 211. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing therebetween is reduced to 0). In addition, the first radiation element 120 may be further coupled to the proximity sensor 230.

The second radiation element 130 may substantially have a J-shape. Specifically, the second radiation element 130 has a first end 131 and a second end 132. The first end 131 of the second radiation element 130 is coupled to a feeding point FP. The second end 132 of the second radiation element 130 is an open end. The feeding point FP may be further coupled to the RF module 220. In some embodiments, the second radiation element 130 is adjacent to the first radiation element 120. A first coupling gap GC1 is formed between the first radiation element 120 and the second radiation element 130.

The third radiation element 140 may substantially have a W-shape. Specifically, the third radiation element 140 has a first end 141 and a second end 142. The first end 141 of the third radiation element 140 is coupled to the feeding point FP. The second end 142 of the third radiation element 140 is an open end. For example, the second end 122 of the first radiation element 120, the second end 132 of the second radiation element 130, and the second end 142 of the third radiation element 140 may substantially extend toward the same direction. In some embodiments, the third radiation element 140 is adjacent to the first radiation element 120. A second coupling gap GC2 is formed between the first radiation element 120 and the third radiation element 140.

The fourth radiation element 150 may substantially have a straight-line shape. Specifically, the fourth radiation element 150 has a first end 151 and a second end 152. The first end 151 of the fourth radiation element 150 is coupled to the ground element 110. The second end 152 of the fourth radiation element 150 is an open end. In some embodiments, the fourth radiation element 150 is adjacent to the third radiation element 140. A third coupling gap GC3 is formed between the third radiation element 140 and the fourth radiation element 150.

The dielectric substrate 160 may be an FR4 (Flame Retardant 4) substrate, a PCB (Printed Circuit Board), or an FPC (Flexible Printed Circuit). The first radiation element 120, the second radiation element 130, the third radiation element 140, and the fourth radiation element 150 may all be disposed on the same surface of the dielectric substrate 160.

In some embodiments, the first radiation element 120 is configured as a sensing pad of the proximity sensor 230. For example, the proximity sensor 230 can analyze an equivalent capacitance between the first radiation element 120 and the conductive element HB, and then estimate the specific distance DS between the first radiation element 120 and the conductive element HB. Next, the proximity sensor 230 can transmit the relative information of the specific distance DS to the tunable circuit element 211 and the RF module 220. For example, the aforementioned relative information may be a voltage, a current, or a signal of any type.

As mentioned above, if the specific distance DS is longer than the first threshold distance TH1, the RF module 220 will maintain the RF power P at a predetermined level. Conversely, if the specific distance DS is shorter than or equal to the first threshold distance TH1, the RF module 220 will reduce the RF power P to a relatively low level.

The tunable circuit element 211 includes a switch element 215, a first capacitor C1, and a second capacitor C2. For example, the switch element 215 may be an SPST (Single Port Single Throw) switch. The first capacitor C1 and the second capacitor C2 are respectively coupled to the ground element 110. The capacitance of the first capacitor C1 may be greater than that of the second capacitor C2. A terminal of the switch element 215 is coupled to the first end 121 of the first radiation element 120, and another terminal of the switch element 215 is switchable between the first capacitor C1 and the second capacitor C2. For example, the switching state of the switch element 215 may be determined according to the relative information of the specific distance DS. In some embodiments, if the specific distance DS is longer than the second threshold distance TH2, the switch element 215 will be switched to the first capacitor C1, and conversely, if the specific distance DS is shorter than or equal to the second threshold distance TH2, the switch element 215 will be switched to the second capacitor C2, but it is not limited thereto. In alternative embodiments, the first capacitor C1 and the second capacitor C2 may be replaced with two different inductor, two different resistors, or other circuit elements.

Figure 3:
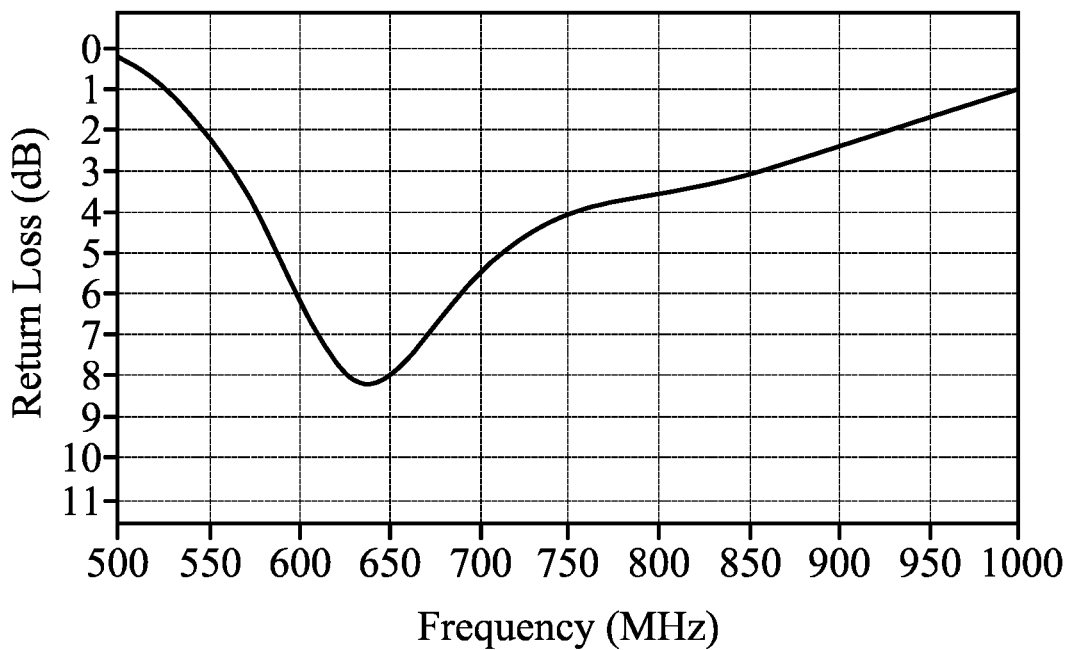
FIG. 3 is a diagram of return loss of a hybrid antenna of a mobile device when a switch element is switched to a first capacitor according to an embodiment of the invention.
Figure 4:
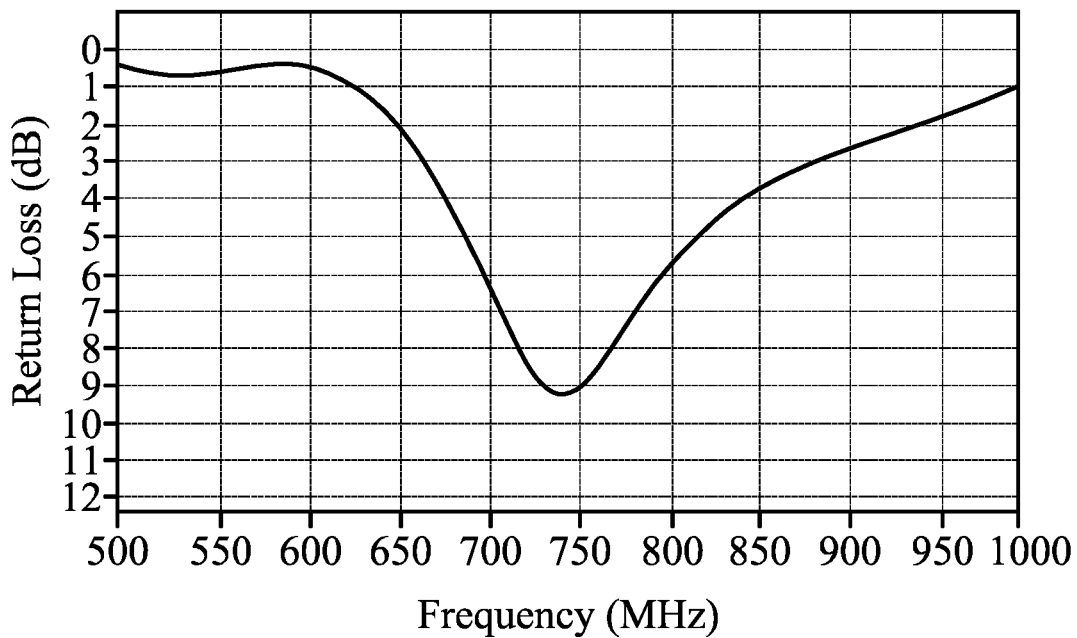
FIG. 4 is a diagram of return loss of a hybrid antenna of a mobile device when a switch element is switched to a second capacitor according to an embodiment of the invention.

FIG. 3 is a diagram of return loss of the hybrid antenna 201 of the mobile device 101 when the switch element 215 is switched to the first capacitor C1 according to an embodiment of the invention. FIG. 4 is a diagram of return loss of the hybrid antenna 201 of the mobile device 101 when the switch element 215 is switched to the second capacitor C2 according to an embodiment of the invention. Please refer to FIG. 3 and FIG. 4 together.

According to the measurements of FIG. 3 and FIG. 4, if the tunable circuit element 211 uses the second capacitor C2 to replace the first capacitor C1, the operational frequency of the hybrid antenna 201 of the mobile device 101 will be significantly increased. Thus, when the conductive element HB is close to the mobile device 101, the tunable circuit element 211 is configured to compensate for the non-ideal antenna low-frequency shift caused by the conductive element HB.

In some embodiments, the hybrid antenna 201 of the mobile device 101 can cover a first frequency band, a second frequency band, a third frequency band, and a fourth frequency band. For example, the first frequency band may be from 600 MHz to 960 MHz, the second frequency band may be from 1710 MHz to 2170 MHz, the third frequency band may be from 2300 MHz to 2700 MHz, and the fourth frequency band may be from 3300 MHz to 3800 MHz, but they are not limited thereto. Therefore, the hybrid antenna 201 of the mobile device 101 can support at least the wideband operations of LTE (Long Term Evolution).

With respect to the antenna theory, each of the first radiation element 120 and the second radiation element 130 is excited to generate a fundamental resonant mode, thereby forming the first frequency band. The first radiation element 120 is also excited to generate a higher-order resonant mode, thereby forming the third frequency band. The third radiation element 140 is excited to generate the second frequency band. The fourth radiation element 150 is excited to generate the fourth frequency band. It should be noted that the tunable circuit element 211 is mainly configured to fine-tune the impedance matching of the first frequency band.

In some embodiments, the element sizes and element parameters of the mobile device 101 will be described below. The first threshold distance TH1 may be substantially equal to 10 mm. The second threshold distance TH2 may be substantially equal to 5 mm. The length L1 of the first radiation element 120 may be substantially equal to 0.25 wavelength ($\lambda/4$) of the lowest frequency of the first frequency band. The length L2 of the second radiation element 130 may be substantially equal to 0.25 wavelength ($\lambda/4$) of the highest frequency of the first frequency band. In the first radiation element 120, the width W11 of the wide portion 124 may be from 3 mm to 4 mm, and the width W12 of the wide portion 125 may be from 1 mm to 2 mm. The length L3 of the third radiation element 140 may be substantially equal to 0.25 wavelength ($\lambda/4$) of the second frequency band. The length L4 of the fourth radiation element 150 may be substantially equal to 0.25 wavelength ($\lambda/4$) of the fourth frequency band. The width of each of the first coupling gap GC1, the second coupling gap GC2, and the third coupling gap GC3 may be from 0.5 mm to 2 mm. The capacitance of the first capacitor C1 may be about 10 times the capacitance of the second capacitor C2. For example, the capacitance of the first capacitor C1 may be about 50 pF, and the capacitance of the second capacitor C2 may be about 5 pF. The above ranges of element sizes and element parameters are calculated and obtained according to the results of many experiments, and they help to optimize the operational bandwidth and the impedance matching of the hybrid antenna 201 of the mobile device 101.

Figure 5:
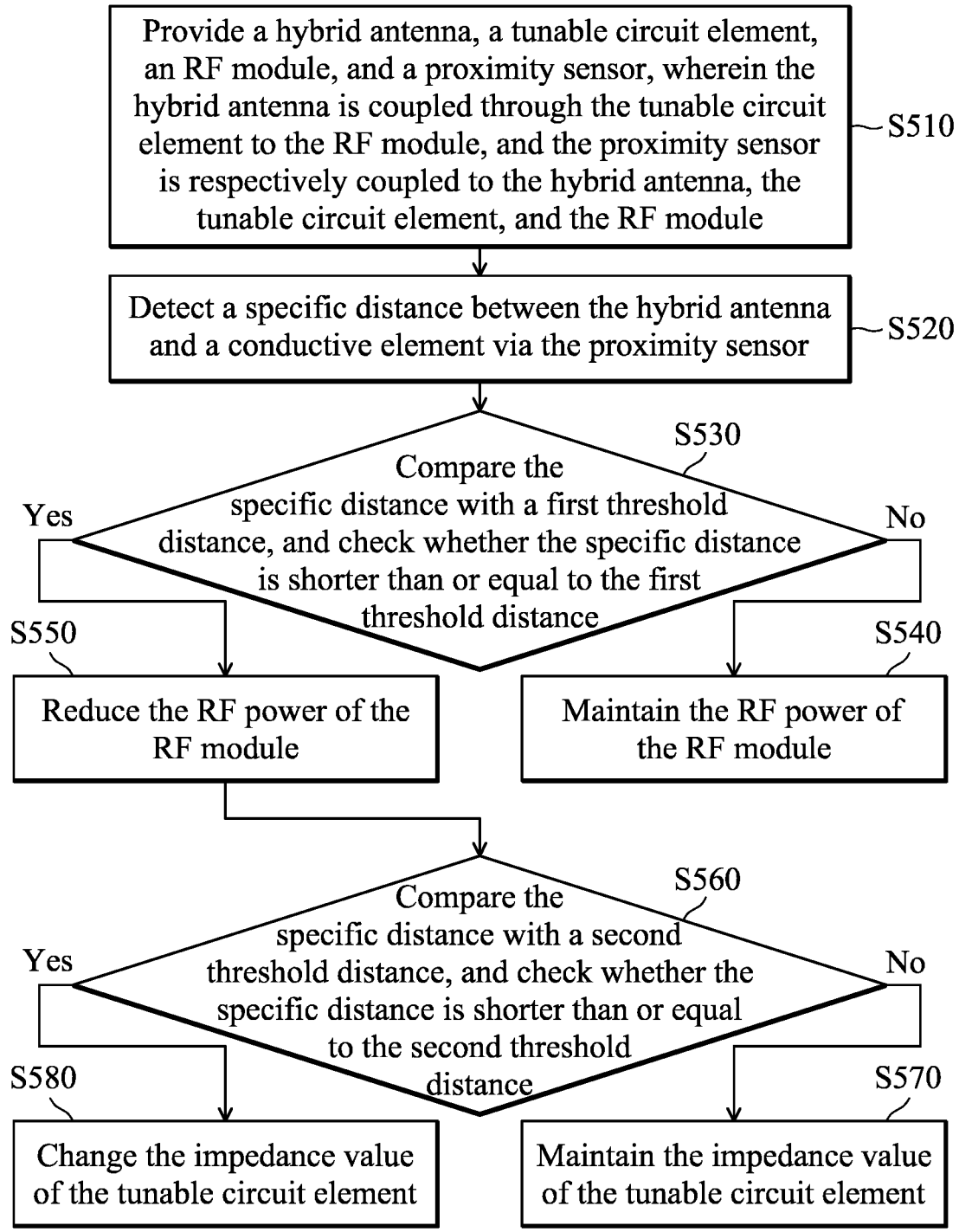
FIG. 5 is a flowchart of a control method according to an embodiment of the invention.

FIG. 5 is a flowchart of a control method according to an embodiment of the invention. The aforementioned control method includes the following steps. In step S510, a hybrid antenna, a tunable circuit element, an RF (Radio Frequency) module, and a proximity sensor are provided. The hybrid antenna is coupled through the tunable circuit element to the RF module. The proximity sensor is respectively coupled to the hybrid antenna, the tunable circuit element, and the RF module. In step S520, a specific distance between the hybrid antenna and a conductive element is detected by the proximity sensor. In step S530, the specific distance is compared with a first threshold distance, and whether the specific distance is shorter than or equal to the first threshold distance is checked. If not, in step S540, the RF power of the RF module will be maintained. If so, in step S550, the RF power of the RF module will be reduced. In step S560, the specific distance is compared with a second threshold distance, and whether the specific distance is shorter than or equal to the second threshold distance is checked. If not, in step S570, the impedance value of the tunable circuit element will be maintained. If so, in step S580, the impedance value of the tunable circuit element will be changed. It should be noted that the above steps are not required to be performed in order, and all of the features of the embodiments of FIGS. 1 to 4 may be applied to the control method of FIG. 5.

The invention proposes a novel mobile device and a control method thereof. Compared to the conventional design, the invention has at least the advantages of improving both the SAR and impedance matching, reducing the human interference, and enhancing the communication quality, and therefore it is suitable for application in a variety of mobile communication devices.

Note that the above element sizes, element shapes, and frequency ranges are not limitations of the invention. An antenna designer can fine-tune these settings or values according to different requirements. It should be understood that the mobile device and the control method of the invention are not limited to the configurations of FIGS. 1-5. The invention may merely include any one or more features of any one or more embodiments of FIGS. 1-5. In other words, not all of the features displayed in the figures should be implemented in the mobile device and the control method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device for interacting with a conductive element, comprising:
    a hybrid antenna, having dual functions of a radiator and a sensing pad;
    a tunable circuit element, providing an impedance value;
    an RF (Radio Frequency) module, generating RF power, wherein the hybrid antenna is coupled through the tunable circuit element to the RF module; and
    a proximity sensor, respectively coupled to the hybrid antenna, the tunable circuit element, and the RF module, and configured to detect a specific distance between the hybrid antenna and the conductive element, wherein the tunable circuit element and the RF module are operated according to relative information of the specific distance;
    wherein if the specific distance is shorter than or equal to a first threshold distance, the RF module reduces the RF power;
    wherein if the specific distance is shorter than or equal to a second threshold distance, the tunable circuit element changes the impedance value;
    wherein the hybrid antenna comprises:
    a ground element;
    a first radiation element, coupled through the tunable circuit element to the ground element, wherein the first radiation element is further coupled to the proximity sensor;
    a second radiation element, coupled to a feeding point;
    a third radiation element, coupled to the feeding point;
    a fourth radiation element, coupled to the ground element; and
    a dielectric substrate, wherein the first radiation element, the second radiation element, the third radiation element, and the fourth radiation element are disposed on the dielectric substrate.

2. The mobile device as claimed in claim 1, wherein the first threshold distance is substantially equal to 10 mm.

3. The mobile device as claimed in claim 1, wherein the second threshold distance is substantially equal to 5 mm.

4. The mobile device as claimed in claim 1, wherein the first radiation element substantially has an L-shape comprising a wide portion and a narrow portion, and the narrow portion is coupled through the wide portion to the tunable circuit element.

5. The mobile device as claimed in claim 1, wherein the second radiation element substantially has a J-shape adjacent to the first radiation element.

6. The mobile device as claimed in claim 1, wherein the third radiation element substantially has a W-shape adjacent to the first radiation element and the fourth radiation element.

7. The mobile device as claimed in claim 1, wherein the fourth radiation element substantially has a straight-line shape.

8. The mobile device as claimed in claim 1, wherein the tunable circuit element comprises:
    a first capacitor, coupled to the ground element;
    a second capacitor, coupled to the ground element; and
    a switch element, coupled to the first radiation element, wherein the switch element is switchable between the first capacitor and the second capacitor.

9. The mobile device as claimed in claim 1, wherein the hybrid antenna covers a first frequency band, a second frequency band, a third frequency band, and a fourth frequency band, the first frequency band is from 600 MHz to 960 MHz, the second frequency band is from 1710 MHz to 2170 MHz, the third frequency band is from 2300 MHz to 2700 MHz, and the fourth frequency band is from 3300 MHz to 3800 MHZ.

10. The mobile device as claimed in claim 9, wherein a length of the first radiation element is substantially equal to 0.25 wavelength of the lowest frequency of the first frequency band.

11. The mobile device as claimed in claim 9, wherein a length of the second radiation element is substantially equal to 0.25 wavelength of the highest frequency of the first frequency band.

12. The mobile device as claimed in claim 9, wherein a length of the third radiation element is substantially equal to 0.25 wavelength of the second frequency band.

13. The mobile device as claimed in claim 9, wherein a length of the fourth radiation element is substantially equal to 0.25 wavelength of the fourth frequency band.

14. A control method, comprising the steps of:
    providing a hybrid antenna, a tunable circuit element, an RF (Radio Frequency) module, and a proximity sensor, wherein the hybrid antenna is coupled through the tunable circuit element to the RF module, and the proximity sensor is respectively coupled to the hybrid antenna, the tunable circuit element, and the RF module;
    detecting a specific distance between the hybrid antenna and a conductive element via the proximity sensor;
    comparing the specific distance with a first threshold distance;
    if the specific distance is shorter than or equal to the first threshold distance, reducing RF power of the RF module;
    comparing the specific distance with a second threshold distance; and
    if the specific distance is shorter than or equal to the second threshold distance, changing an impedance value of the tunable circuit element;
    wherein the hybrid antenna comprises a ground element, a first radiation element, a second radiation element, a third radiation element, a fourth radiation element and a dielectric substrate, the first radiation element is coupled through the tunable circuit element to the ground element, the first radiation element is further coupled to the proximity sensor, the second radiation element is coupled to a feeding point, the third radiation element is coupled to the feeding point, the fourth radiation element is coupled to the ground element, and the first radiation element, the second radiation element, the third radiation element and the fourth radiation element are disposed on the dielectric substrate.

* * * * *